United States Patent Office 3,499,537
Patented Mar. 10, 1970

3,499,537
PRODUCTION OF ION EXCHANGE MEMBRANE
James A. Bittles, Claremont, Calif., assignor to McDonnell Douglas Corporation, Santa Monica, Calif., a corporation of Maryland
No Drawing. Filed July 24, 1967, Ser. No. 655,334
Int. Cl. B01d *39/14;* C01g *31/00*
U.S. Cl. 210—510                          23 Claims

ABSTRACT OF THE DISCLOSURE

Production of aluminum vanadate ion exchange membranes by dissolving vanadium oxide and an aluminum salt in either acid or base solution, precipitating aluminum vanadate from solution by addition of base or acid, respectively, to such solutions, and removing and drying the precipitate, to form an aluminum vanadate cation exchanger when precipitated from acid solution or an aluminum vanadate anion exchanger when precipitated from base solution. The resulting powdered ion exchangers, either alone, or together with a fused ceramic such as aluminosilicate, are then pressed and sintered to form strong stable aluminum vanadate ion exchange membranes operable at high temperatures up to 900° C.

---

This invention resulted from work done under a contract with the Office of Saline Water in the Department of the Interior, entered into pursuant to the Saline Water Act, 42 U.S.C. 1951–1958g.

This invention relates to the preparation of ion exchangers, and is particularly directed to novel procedure for the preparation of aluminum vanadate ion exchangers, and especially to aluminum vanadate ion exchange membranes having improved stability and operability at elevated temperatures, and to the ion exchangers and ion exchange membranes so produced.

Ion exchange is generally defined as the reversible exchange of ions between a liquid phase and a solid phase unaccompanied by any radical change in the solid structure. The solid structure is the ion exchanger and may be pictured as a network, lattice, or matrix incorporating charged sites each electrically balanced by a counter-ion of the opposite charge. The counter-ions are readily exchanged for mobile ions of a similar charge type existing in a solution surrounding and permeating the ion exchanger. When the counter-ions are negatively charged, the ion exchanger functions as an anion exchanger. When the counter-ions are positively charged, the ion exchanger functions as a cation exchanger.

Because of their ion selective characteristics, ion exchangers find extensive use in industrial processes for demineralizing water and other solvents of soluble ionic contaminants. In such processes, the ion exchangers previously have generally taken the forms of organic ion exchange or permselective membranes which by proper choice of organic materials are either cation or anion selective.

In use, the cation and anion selective organic membranes are alternately supported in vertical planes between a pair of plate electrodes to form an electrodialysis cell. The solution being demineralized is passed downward between the membranes and subjected to a transverse electric field extending between the electrodes. Under the influence of the electric field and the permselectivity of the organic membranes, ions of positive and negative charge type in the solution migrate through different membranes, and thus the electrodialysis cell employing the above-noted organic membranes operates to produce demineralization of the solution.

In practice however, organic ion exchange or permselective membranes are subject to a number of critical limitations. For example, organic membranes become fouled or plugged after relatively short periods of use. Being composed or organic materials, the membranes are also susceptible to atack by bacteria in solution. Further, organic permselective membranes lack the ability to selectively transport specific ions and tend to break down at elevated temperature approaching and above 125° C.

The foregoing problems of organic membranes may be alleviated, to some extent, by inorganic ion exchangers. Until recently however, it has not been possible to form inorganic permselective membrances having sufficient strength and ion exchange properties to render them suitable for electrodialysis purposes. For this reason, inorganic ion exchangers have been utilized almost exclusively in particulate form. Even then their use has been primarily limited to column demineralization of soluble ionic solutions wherein specific ions are absorbed by the particulate ion exchangers. Batch demineralization techniques using particulate inorganic ion exchangers have found only limited use in the demineralization and purification of water and other solutions.

According to the present invention, an aluminum vanadate ion exchanger is prepared by precipitation thereof from an acid or base solution of a soluble aluminum salt and vanadium pentoxide (vanadic acid), by addition to said solution of base or acid, respectively.

Thus there is provided according to the invention a process for preparing an aluminum vanadate ion exchanger which comprises dissolving a soluble aluminum salt and vanadium pentoxide in a solution selected from the group consisting of aqueous acid and aqueous base solutions, and precipitating an aluminum vanadate ion exchanger from said acid solution by addition of base, or from said base solution by addition of acid. The precipitate is removed from the solution, and preferably is treated or digested as hereinafter further described, to remove any soluble salt such as soluble aluminum salt.

The resulting aluminum vanadate in particulate form is dried, and the dried powder is pressed and sintered, according to procedure described more fully below, to produce an aluminum vanadate ion exchange membrane. Alternatively, the dried alumium vanadate powder can be mixed with a fusible ceramic, followed by pressing and sintering, as described hereinafter, to produce an aluminum vanadate ion exchange membrane.

The aluminum vanadate ion exchanger which is precipitated from acid solution, that is, by addition of a base, as described above, functions as an aluminum vanadate cation exchanger, and the aluminum vanadate which has been precipitated from a base solution, that is, by addition of acid as noted above, functions as an anion exchanger.

The invention procedure provides an efficient sintered aluminum vanadate ion exchange membrane, which after sintering still unexpectedly retains the high ion exchange activity and conductivity characteristics of the particulate or powdered aluminum vanadate, is highly resistant to deterioration and fouling, and which remains stable and operable, retaining its ion exchange and permselective properties at elevated temperatures above 125° C., e.g., up to about 900° C. and above.

Aluminum vanadate ion exchange materials according to the invention are prepared according to one mode of procedure by dissolving an acid soluble aluminum salt, e.g., aluminum oxide, aluminum chloride, aluminum nitrate, and the like, and vanadium pentoxide (vanadic acid) in an aqueous acid solution such as an aqueous mineral acid solution, e.g., a solution of hydrochloric, sulfuric or nitric acid. Thus for example, there can be provided a 0.1 to 10 molar aqueous solution of hydrochloric acid containing aluminum oxide and vanadium pentoxide in amounts such as to provide equimolar concentrations of aluminum and vanadium ions. The aluminum vanadate is then precipitated from the solution by adding a solution of sodium hydroxide in suitable concentration to the acid solution of the aluminum and vanadium ions, the pH of the final solution being less than 7, and the aluminum vanadate precipate so obtained is filtered out. The resulting aluminum vanadate precipitated from acid solution unexpectedly functions as a cation exchanger.

In an alternative mode of procedure, an alkali soluble aluminum salt as noted above, such as aluminum oxide or aluminum chloride, and vanadium pentoxide are first dissolved in potassium hydroxide. Thus, for example, there can be provided a 0.1 to 10 molar potassium hydroxide solution containing aluminum chloride and vanadium pentoxide in amounts such as to provide equimolar concentrations of aluminum and vanadium ions. An aqueous solution of an acid, e.g., hydrochloric acid, in suitable concentration, is then added to the above base or alkaline solution, producing precipitation, the pH of the final solution being greater than 7, and the aluminum vanadate precipitate is then filtered out. The resulting aluminum vanadate precipitated from base solution unexpected functions as an anion exchanger.

In each of the procedures described above, the aluminum vanadate precipitate can then be dried. However, although not necessary, it is preferred prior to such drying to subject the aluminum vanadate precipitate removed from the acid or base solution, to a washing or digesting treatment, e.g., to remove remaining soluble salts such as aluminum chloride, or to insure the presence of a desired cation or a desired anion in the aluminum vanadate ion exchanger.

Thus, for example, in the case of an acid precipitated aluminum vanadate, the precipitate can be treated or digested with one or more washes of water, of acid such as hydrochloric acid, and of aqueous solutions containing a desired cation such as potassium chloride, lithium chloride or sodium chloride so as to insure the presence of such cation in the aluminum vanadate ion exchanger, if desired. On the other hand, a base precipitated aluminum vanadate can be treated or digested with one or more solutions, for example, with water and with aqueous solutions of a salt such as potassium chloride or sodium nitrate, if it is desired to have a chloride or nitrate anion present in the final aluminum vanadate product.

The acid and base precipitated aluminum vanadate produced by the above procedures are ion exchange materials of a relatively complex nature whose chemical structure is not known. The general formula of such aluminum vanadates can be represented in the form of the oxides of aluminum and of vanadium and which can be in the acid or basic form, as follows:

$$(Al_2O_3)_n \cdot (V_2O_5)_m \cdot (H_2O)_x$$

The values of $n$, $m$ and $x$ in the above formula are not known to any degree of certainty, but it is believed that the ratio of $n$ to $m$ can range from about 2 to about 0.5, $m$ can range from about 2 to about 10, and $x$ from about 3 to about 4. In the case of the anion exchanger, the ratio of $n$ to $m$ preferably can range from about 1 to 0.5, and for the cation exchanger perferably from about 1 to about 2. Also, it is believed that small amounts of alkali metal ions, e.g., sodium and potassium ions, are present in the cation exchanger, and small amounts of anions such as chloride ions are present in the anion exchanger, in the combined form. Small amounts of uncombined electrolyte may be retained in the dry powder. Retention of absorbed electrolyte and soluble salts is believed minimal, since the aqueous digestive treatments noted above showed no free or uncombined ions.

Drying of the acid or base precipitated aluminum vanadate, usually following the digestive treatments, if the latter are employed, is carried out at generally temperatures of about 80 to about 110° C. The resulting powder can be employed in its particulate form as an ion exchanger, e.g., ground to pass a 100 mesh screen, but preferably is formed into pressed and sintered inorganic membranes. This can be accomplished according to one mode of procedure, by placing an appropriate amount of the powder in a die and pressing at pressures ranging from about 2,000 to about 20,000 p.s.i to form the pressed membrane of suitable shape and thickness. The membranes are then sintered at temperatures ranging from about 500 to about 800° C. for a period of about 2 to about 8 hours.

The sintered aluminum vanadate membrane has essentially the composition represented by the formula noted above except that the combined water component $(H_2O)_x$ is substantially eliminated during sintering.

According to another mode of procedure, the dry aluminum vanadate powder can be mixed with a fusible ceramic, preferably in minor proportion, such as aluminosilicate, or alkali metal or alkaline earth metal salts of aluminosilicate, such as the sodium, potassium, barium and calcium salts of aluminosilicate, alumina, and the like, and such mixture pressed and sintered by procedure substantially similar to that described above, to produce an aluminum vanadate ion exchange membrane. The proportions of fusible ceramic mixed with the aluminum vanadate powder according to this procedure can range from about 5 to about 30% of the ceramic, e.g., aluminosilicate, based on the total weight of the mixture.

In each of the procedures noted above for obtaining the aluminum vanadate ion exchange membranes, it was unexpected that after sintering the aluminum vanadate powder at relatively high temperatures, the resulting membranes would retain substantially the ion exchange and permselective properties of the aluminum vanadate in its particulate or powder form. Thus the resulting aluminum vanadate membranes following bonding of the particles of aluminum vanadate powder, retain the ion exchange sites in the membrane and such bonding is effected during sintering without occluding or blocking the active ion exchange sites. Also, following sintering, the aluminum vanadate ion exchange membranes of the invention surprisingly have been found to possess suitable pore size or pore diameter, e.g., ranging from about 90 to about 200 A. (Angstroms), preferably of the order of about 50 to about 100 A., thus providing good ion exchange effectiveness.

It was surprising that the aluminum vanadate powder produced according to the procedures described above, when mixed with a fusible ceramic such as aluminosilicate, produces a strong ion exchange membrane of good ion exchange efficiency and permselectivity, and having a high transport number. It would be expected under such circumstances that the bonding of particles of aluminum vanadate with particles of inert ceramic, would occlude and destroy to a major extent the ion exchange sites in the resulting membrane, so that such membrane would have inferior ion exchange characteristics.

It was also unexpectedly found that the aluminum vanadate precipitated from acid solution functions as a cation exchanger, whereas aluminum vanadate precipitated from basic solution functions as an anion exchanger.

The aluminum vanadate ion exchange membranes produced according to the invention have varying thicknesses, e.g., ranging from about 0.005 to about 0.050 inch. These membranes have high strength, e.g., a transverse strength of about 1,000 to about 5,000 p.s.i., have high anion or cation transport numbers for the anion or cation exchange membranes, respectively, e.g., ranging from about 0.8 to about 0.99, high current efficiency ranging from 85 to about 95% and high electrode efficiencies of from about 80 to about 99%, and operate efficiently as ion exchange membranes at elevated temperatures up to about 900° C. for prolonged periods of operation without deterioration or fouling as a result of contact with corrosive chemical solutions or subjection to such high temperatures. Such membranes are not only effective as electrodialysis membranes, but also can be used in fuel cells and batteries. Also, aluminum vanadate ion exchange membranes produced according to the invention procedure have the additional advantage noted above, that they can be designed either as a cation or anion exchanger.

The following are examples of practice of the invention:

EXAMPLE 1

Aluminum oxide and vanadium pentoxide were dissolved in 1.0 molar HCl solution, in an amount to provide concentrations of aluminum ($Al^{+3}$) and vanadium ($V^{+5}$) ions each in 0.1 molar concentration. Aluminum vanadate was then precipitated from such solution by adding a solution of 2.0 molar sodium hydroxide dropwise until no further precipitate was obtained. The gelatinous precipitate was then filtered and dried to produce particulate aluminum vanadate which functions as a cation exchanger.

EXAMPLE 2

Aluminum chloride and vanadium pentoxide were each dissolved in 0.1 molar potassium hydroxide solution, in a concentration such as to provide aluminum and vanadium ions each in a concentration 0.1 molar. Aluminum vanadate was precipitated by adding 1.0 hydrochloric acid solution to the alkaline solution containing aluminum and vanadium ions, until no further precipitate formed. It was observed that a precipitate first commenced to form at a pH of about 10 and that precipitation was complete at a pH of about 7. The precipitate was filtered and dried. The particulate aluminum vanadate product thus produced functions as an anion exchanger.

EXAMPLE 3

70.6 millimoles vanadium pentoxide and 141.2 millimoles aluminum chloride were dissolved in 1 molar HCl solution. Aluminum vanadate was precipitated from such solution by adding 20% potassium hydroxide solution, with precipitation ceasing at a final pH of 4.

The precipitate was removed from the solution and was first digested or treated with 0.01 molar hydrochloric acid solution, then with 0.1 molar hydrochloric acid solution, and finally with water.

The digested product was then dried at about 110° C., providing about 20 grams of aluminum vanadate. Such aluminum vanadate product functions as a cation exchanger.

EXAMPLES 4, 5, 6 AND 7

Procedure similar to that noted in Example 3 was carried out in each of Examples 4, 5, 6 and 7 noted below, employing the solutions and treatments outlined in Table I below for each of these examples.

of the ion exchanger, in Example 5 a hydrogen salt form, in Example 6 a lithium salt form, and in Example 7, a sodium salt form.

Each of the dried aluminum vanadate products of Examples 4 to 7 function as cation exchangers.

EXAMPLE 8

The aluminum vanadate precipitate isolated in Example 2 above is digested with 1 molar potassium chloride solution and then with water. The resulting aluminum vanadate retains chloride as anion, and functions as an anion exchanger.

EXAMPLE 9

The aluminum vanadate precipitate isolated in Example 2 is digested with 1 molar sodium nitrate solution and then with water so that the resulting aluminum vanadate ion exchanger retains nitrate anions. This material, as in the case of that of Example 8, also functions as an anion exchanger.

EXAMPLE 10

The aluminum vanadate (base precipitated) dried and powdered ion exchanger of Example 2 was placed in a die, and the powder pressed at pressures of about 6,000 to about 20,000 p.s.i. to form membranes of a size 1.5 inch in diameter and having a thickness of about 0.032 inch.

The resulting pressed membranes were set upon ceramic tile, placed in a furnace and sintered at temperature of about 600° C. for approximately 4 hours.

EXAMPLE 11

The aluminum vanadate powder produced in Example 1 above was mixed with an aluminosilicate material composed of a mixture of alkali metal, including sodium and potassium, and alkaline earth metal, including calcium and barium, aluminosilicates. Such mixture was composed of 80% of the acid precipitated aluminum powder of Example 1 and 20% by weight of the aluminosilicate material.

Such mixture was pressed and sintered into ion exchange membranes substantially according to the procedure of Example 10 above, producing ion exchange membranes having a thickness of 0.030 inch.

EXAMPLE 12

The aluminum vanadate base precipitated powder of Example 2 was mixed with aluminosilicate material of the type described above in Example 11, in a proportion of 90% of the aluminum vanadate and 10% of the aluminosilicate material.

The resulting mixture was then pressed and sintered substantially according to the procedure of Example 10 above, to provide aluminum vanadate ion exchange membranes.

EXAMPLE 13

Aluminum vanadate ion exchange membranes of Examples 10 and 11 were each tested for electrical resist-

TABLE I

| Ex. | Product Composition | Procedure | Digestions | Yields, grams |
|---|---|---|---|---|
| 4 | Aluminum vanadate precipitated from acid solution, potassium salt. | 35.3 mmoles $V_2O_5$ in 1 molar HCl and 70.6 mmoles $AlCl_3$ in 1 molar HCl, precipitated with 1.98 mmoles KOH—final pH 4. | 0.01 M HCl, 0.1 M HCl, 1 M KCl, and $H_2O$. | 10 |
| 5 | Aluminum vanadate precipitated from acid solution, hydrogen salt. | do | 0.01 M HCl, 0.1 M HCl, and $H_2O$. | 10 |
| 6 | Aluminum vanadate precipitated from acid solution, lithium salt. | do | 0.1 M HCl, 0.1 M HCl, 1 M Li Cl and $H_2O$. | 10 |
| 7 | Aluminum vanadate precipitated from acid solution, sodium salt. | do | 0.01 M HCl, 0.1 M HCl, 1 M NaCl and $H_2O$. | 10 |

It will be noted that in Example 4 of the table above, the digestive treatment produced a potassium salt form ance, and anion and cation transport numbers, in aqueous 0.1 molar potassium chloride solution.

The results are noted in Table II below:

TABLE II

| Aluminum Vanadate Membrane of Example— | Membrane Resistance (ohms) | Cation Transport Number | Anion Transport Number |
|---|---|---|---|
| 10 | 50 | 0.01 | 0.99 |
| 10 | 42 | 0.05 | 0.95 |
| 11 | 10 | 0.99 | 0.0 |
| 11 | 20 | 0.99 | 0.0 |

From Table II above, it is noted that the membranes of Example 10 and 11 have low electrical resistance (good conductivity), particularly in the case of the membranes of Example 11, and that the membranes of Examples 10 and 11 have high anion and high cation transport numbers, respectively, and are efficient ion exchange membranes for electrodialysis. It is interesting to note that the membranes of Example 11 have unusually low resistance or high conductivity even though such membranes contain approximately 20% of inert aluminosilicate.

EXAMPLE 14

The aluminum vanadate ion exchange membranes of Examples 10, 11 and 12 were employed as electrodialysis membranes respectively in similar electrodialysis cells for desalting 0.1 molar potassium chloride solution in a static single cycle test.

The data and results of such electrodialysis tests are noted in Table III below:

TABLE III

| Aluminum vanadate membranes of example— | Transport Number | Current (ma.) | Current efficiency (percent) | Cathode efficiency (percent) | Anode efficiency (percent) | Parts per million removed (p.p.m.) | Percent desalting |
|---|---|---|---|---|---|---|---|
| 10 | Anion, 0.95 | 2 | 90.0 | 99.0 | 94.5 | 1,110 | 14.8 |
| 11 | Cation, 0.96 | 2 | 85.5 | 83.0 | 99.0 | 1,100 | 14.7 |
| 11 | Cation, 0.99 | 2 | 90.0 | 99.0 | 94.5 | 1,110 | 14.8 |
| 12 | Anion, 0.91 | 2 | 85.5 | 83.0 | 99.0 | 1,100 | 14.7 |

From Table III above, it is seen that the membranes of each of Examples 10, 11 and 12 have high transport numbers, and function at high current and electrode efficiencies, for removal of approximately the same amount of salt in each case, to produce about a 15% desalting.

From the foregoing, it is seen that the invention provides novel procedure for producing aluminum vanadate ion exchanger, particularly in the form of ion exchange membranes, useful in electrodialysis and fuel cell applications, and particularly for operation at elevated temperatures.

While I have described particular embodiments of my invention for purposes of illustration, various modifications and adaptations thereof will occur to those skilled in the art, and thus it will be understood that the invention is not to be taken as limited except by the scope of the appended claims.

I claim:

1. A process for preparing an aluminum vanadate ion exchanger, which comprises dissolving a soluble aluminum salt and vanadium pentoxide in a solution selected from the group consisting of aqueous acid and aqueous base solutions, and precipitating an aluminum vanadate ion exchanger from said acid solution by addition of base, or from said base solution by addition of acid.

2. A process as defined in claim 1, wherein said aqueous acid solution is HCl solution and said aqueous base solution is KOH solution.

3. A process as defined in claim 1, wherein said aluminum salt is aluminum chloride, and wherein said aqueous acid solution is HCl solution and said aqueous base solution is KOH solution.

4. A process as defined in claim 1, including removing said precipitate and treating same to remove any remaining soluble salts.

5. A process as defined in claim 1, wherein said aqueous solution is an aqueous acid solution and said precipitating said aluminum vanadate is carried out by addition of a base to said solution, the pH of the final solution being less than 7, said precipitate being a cation exchanger.

6. A process as defined in claim 5, wherein said aqueous solution is an aqueous solution of HCl, and said precipitating aluminum vanadate is carried out by addition of KOH to said solution.

7. A process as defined in claim 6, including digesting said precipitate with aqueous HCl and then with an aqueous solution of a salt selected from the group consisting of potassium chloride, lithium chloride and sodium chloride.

8. A process as defined in claim 1, wherein said aqueous solution is an aqueous base solution and said precipitating said aluminum vanadate is carried out by addition of acid to said solution, the pH of the final solution being greater than 7, said precipitate being an anion exchanger.

9. A process as defined in claim 8, wherein said aqueous solution is an aqueous solution of KOH and said precipitating said aluminum vanadate is carried out by addition of HCl to said solution.

10. A process as defined in claim 9, and including removing said precipitate and digesting same with a soluble chloride.

11. A process as defined in claim 1, including removing and drying said precipitate to form an aluminum vanadate powder, pressing said powder to form a membrane, and sintering said pressed membrane.

12. The process as defined in claim 1, including removing and drying said precipitate to form an aluminum vanadate powder, pressing said powder under a pressure of about 2,000 to about 20,000 p.s.i. to form a membrane, and sintering said pressed membrane at temperature of about 500 to about 8000 C. to form a stable ion exchange membrane retaining its ion exchange properties at temperature above 125° C.

13. The process as defined in claim 1, including removing and drying said precipitate to form an aluminum vanadate powder, mixing said powder with a fusible ceramic, pressing said mixture into a membrane, and sintering said pressed membrane.

14. The process as defined in claim 1, including removing and drying said precipitate to form an aluminum vanadate powder, mixing said powder with a fusible ceramic, in an amount of about 5 to about 30% of said ceramic by weight of said mixture, pressing said mixture under a pressure of about 2,000 to about 20,000 p.s.i. to form a membrane, and sintering said pressed membrane at temperature of about 500 to about 800° C. to form a stable ion exchange membrane retaining its ion exchange properties at temperature above 125° C.

15. A process as defined in claim 14, wherein said fusible ceramic is an aluminosilicate.

16. A particulate aluminum vanadate ion exchanger precipitated from an acid or base solution of a soluble aluminum salt and vanadium pentoxide, said ion exchanger having the formula:

$$(Al_2O_3)_n \cdot (V_2O_5)_m \cdot (H_2O)_x$$

where the ration of $n$ to $m$ ranges from about 2 to about 0.5, $m$ ranges from about 2 to about 10, and $x$ ranges from about 3 to about 4.

17. An aluminum vanadate ion exchanger comprising a pressed and sintered porous aluminum vanadate membrane having substantially the ion exchange properties of aluminum vanadate in particulate form, and which retains its ion exchange properties and is stable at temperatures substantially exceeding 125° C., said ion exchange membrane having a transport number ranging from about 0.8 to about 0.99, and an electrode efficiency ranging from about 80 to about 99%, said ion exchanger consisting essentially of an aluminum vanadate having the formula:

$$(Al_2O_3)_n \cdot (V_2O_5)_m$$

where the ratio of $n$ to $m$ ranges from about 2 to about 0.5, and $m$ ranges from about 2 to about 10.

18. An aluminum vanadate ion exchanger as defined in claim 17, said membrane having a porosity ranging from about 90 to about 200 Angstroms.

19. An aluminum vanadate ion exchanger as defined in claim 18, said membrane including a fusible ceramic bonding the aluminum vanadate particles together.

20. An aluminum vanadate ion exchanger as defined in claim 19, said ceramic being an aluminosilicate present in amount ranging from about 5 to about 30% by weight.

21. An aluminum vanadate ion exchanger as defined in claim 17, said membrane including a minor proportion of a fusible ceramic.

22. An aluminum vanadate ion exchanger as defined in claim 16, the ration of $n$ to $m$ ranging from about 1 to 0.5, said ion exchanger being an anion exchanger.

23. An aluminum vanadate ion exchanger as defined in claim 16, the ratio of $n$ to $m$ ranging from about 1 to about 2, said ion exchanger being a cation exchanger.

References Cited

UNITED STATES PATENTS

| | | | |
|---|---|---|---|
| 3,248,339 | 4/1966 | Spes et al. | 210—510 X |
| 3,382,034 | 5/1968 | Kraus | 23—50 |

FOREIGN PATENTS

| | | |
|---|---|---|
| 950,774 | 2/1964 | Great Britain. |

OTHER REFERENCES

Journal of Indian Chem. Society, vol. 8, 1931, pp. 289–292.

SAMIH N. ZAHARNA, Primary Examiner

U.S. Cl. X.R.

23—51; 210—37, 38; 252—456